No. 854,108. PATENTED MAY 21, 1907.
H. J. REYNOLDS.
COMBINED GAGE AND STOP COCK.
APPLICATION FILED OCT. 6, 1906.

Witnesses
Carl Stoughton
Frank F. Campbell

Inventor
Henry J. Reynolds,
By Shepherd & Parker
Attorneys

UNITED STATES PATENT OFFICE.

HENRY J. REYNOLDS, OF CLEVELAND, OHIO.

COMBINED GAGE AND STOP COCK.

No. 854,108.    Specification of Letters Patent.    Patented May 21, 1907.

Application filed October 6, 1906. Serial No. 337,665.

*To all whom it may concern:*

Be it known that I, HENRY J. REYNOLDS, a citizen of the United States, residing at Cleveland, in the county of Cuyahoga and State of Ohio, have invented certain new and useful Improvements in a Combined Gage and Stop Cock, of which the following is a specification.

My invention relates to a combined stop and gage cock for use upon steam boilers and has for its object the provision of a device of this character constructed in such manner that the valve and valve seat of the gage cock may be removed for regrinding or replacement while the boiler is under steam.

A further object of the invention is the provision of improved means for directing the steam or water which issues from the gage cock in the proper direction.

Further objects and advantages of the invention will be set forth in the detailed description which now follows.

Figure 1:
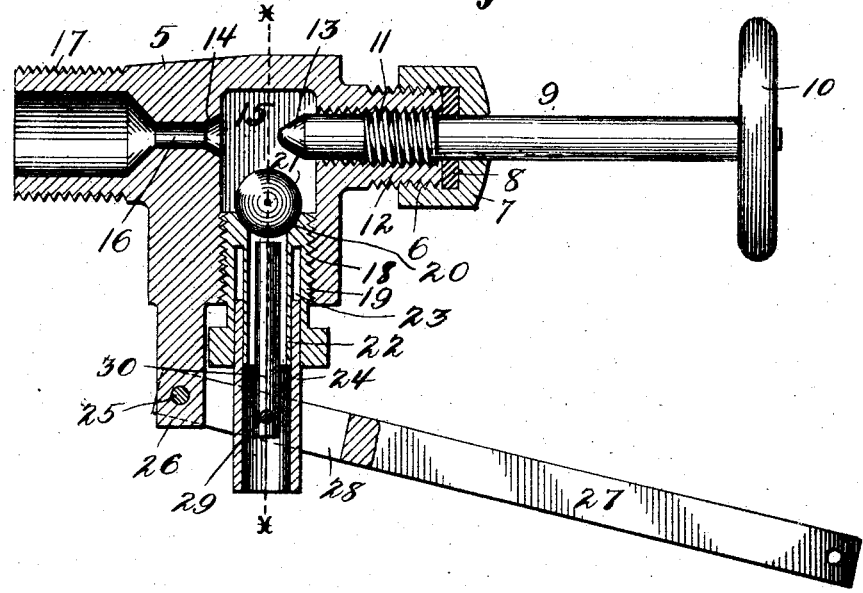
Figure 2:
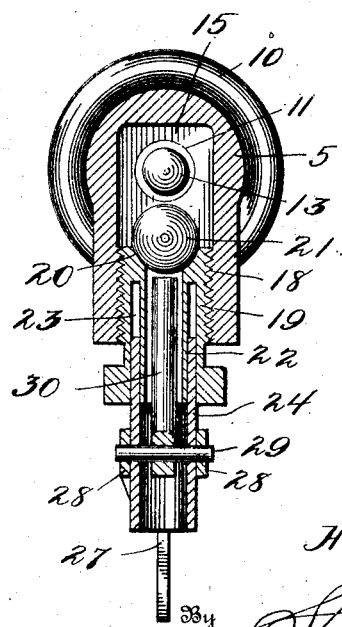

In the accompanying drawing: Figure 1 is a longitudinal vertical section of a stop and gage cock constructed in accordance with the invention, and, Fig. 2 is a transverse section upon line x x of Fig. 1.

Like numerals designate corresponding parts in both of the figures of the drawing.

Referring to the drawing, the numeral 5 designates a valve casing which is externally threaded as at 6, for the reception of a packing nut 7. A gasket 8 together with a packing nut serves to form a steam and water tight packing about a valve stem 9. A hand wheel 10 is mounted upon the outer end of this valve stem in the usual and well known manner. This valve stem is threaded as at 11 into a neck 12 of the valve casing 5 and the inner end of the valve stem is tapered to form a valve 13, this valve being adapted to enter a valve seat 14 located at the juncture of the central chamber 15 and a port 16 which leads to the boiler, not shown. The valve casing 5 is externally threaded as at 17 and it is this portion of the valve casing that is screwed into the boiler. Threaded into the valve casing as at 18 and closing the lower portion of the chamber 15, is a nut 19. A valve seat 20 is formed at the upper end of this nut for the reception of a ball valve 21. A sleeve 22 which is preferably formed integral with the nut, provides a passage for the steam or water from the boiler as will be hereinafter described. The body portion of the nut is channeled as at 23 to space the sleeve from the walls of the nut and a second sleeve 24 receives the lower end of the sleeve 22 and is slidable with relation to said sleeve. Pivoted at 25 to a depending portion 26 of the valve casing 5 is a lever 27. This lever is bifurcated as at 28, the bifurcated portions of said lever straddling the sleeve 24 of the depending portion 26 of the valve casing 5. A pin 29 passes through the bifurcated portion of the lever, through the sleeve 24 and through the lower end of a plunger 30.

The operation of the device is as follows: In Fig. 1 the parts have been illustrated in their normal position. If at this time the engineer or fireman lifts the outer end of the lever 27, the sleeve 24 is lifted, said sleeve sliding between the sleeve 22 and the wall of the nut 19. The plunger 30 is also lifted until its upper end contacts with the ball-valve 21 and lifts said valve from its seat. Water or steam as the case may be, from the boiler, then passes through the port 16, chamber 15 and sleeve 22 to sleeve 24 whence it is discharged. If through wear the valve should begin to leak, the valve stem 9 may be screwed inward by means of the hand wheel 10 until the valve 13 seats itself in the valve seat 14, this cuts off the flow of steam or water from the boiler to the ball valve 21. By removing the pivot 25 the sleeve 24 and the plunger 30 may be pulled out of the nut 19. This nut may then be unscrewed and a new ball substituted or the valve seat 20 reground.

It will be seen that the sliding sleeve construction provides efficient means for preventing the steam or water from striking upon any part of the structure when it is discharged.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a gage cock, the combination with a valve casing adapted to be screwed into a boiler, of a removable nut threaded into said casing, means for conducting steam or water from the boiler to said nut, said nut having an opening formed therethrough, a valve which closes said opening, a sleeve slidably disposed within the nut, a valve actuating member disposed within the sleeve, and a lever to which both the sleeve and the valve actuating member are connected.

2. In a device of the character described, the combination with a valve casing having a chamber formed therein and having a port adapted to conduct steam or water from the boiler to said central chamber, of a valve stem threaded into said casing adapted to close said port, a removable nut threaded into the casing and having an opening formed therethrough, a sleeve slidably disposed in said nut, a valve which normally closes the opening through said nut, a plunger adapted to lift said valve from its seat, and a lever to which both the plunger and the sliding sleeve are secured.

3. In a device of the character described, the combination with a valve casing having a chamber formed therein, of a port for conducting steam or water from the boiler to said chamber, a valve stem threaded into the casing, a valve carried by said valve stem and adapted to close said port, a nut removably threaded into the casing and having an opening formed therethrough, a valve adapted to close said opening, a sleeve slidably disposed within said nut, a member adapted to lift the last named valve from its seat, and a lever pivoted to a member extending from the valve casing, to which both the sliding sleeve and the valve actuating member are pivotally connected.

4. In a device of the character described, the combination with a valve casing having a chamber formed therein, of a port for conducting steam or water from the boiler to said chamber, a valve stem threaded into the casing, a valve carried by said valve stem and adapted to close said port, a nut removably threaded into the casing and having an opening formed therethrough, a valve adapted to close said opening, a sleeve slidably disposed within said nut, a member adapted to lift the last named valve from its seat, and a bifurcated lever pivoted to a member extending from the valve casing, to which both the sliding sleeve and the valve actuating member are pivotally connected.

5. In a device of the character described, the combination with a valve casing having a chamber formed therein, of a port adapted to conduct steam or water from a boiler to said chamber, a valve stem threaded into the casing in alinement with said port and adapted to close said port, a nut threaded into the casing and having a depending sleeve, a second sleeve slidably mounted upon said depending sleeve, a plunger mounted in said second sleeve, a ball valve adapted to close the first named sleeve, and a lever pivoted to a member depending from the valve casing to which both the last named sleeve and the plunger are pivotally connected.

In testimony whereof I affix my signature in presence of two witnesses.

HENRY J. REYNOLDS.

Witnesses:
L. CARL STOUGHTON,
A. L. PHELPS.